(12) United States Patent
Yin et al.

(10) Patent No.: US 11,746,766 B2
(45) Date of Patent: Sep. 5, 2023

(54) ELECTRIC OIL PUMP

(71) Applicant: ZHEJIANG SANHUA INTELLIGENT CONTROLS CO., LTD, Zhejiang (CN)

(72) Inventors: Bingjiu Yin, Zhejiang (CN); Wei Ye, Zhejiang (CN); Yongfeng Sun, Zhejiang (CN); Kai Zhang, Zhejiang (CN); Fangxu Qian, Zhejiang (CN); Liyang Huang, Zhejiang (CN)

(73) Assignee: ZHEJIANG SANHUA INTELLIGENT CONTROLS CO., LTD, Zhejiang (CN)

( * ) Notice: Subject to any disclaimer, the term of this patent is extended or adjusted under 35 U.S.C. 154(b) by 293 days.

(21) Appl. No.: 17/050,176

(22) PCT Filed: May 27, 2019

(86) PCT No.: PCT/CN2019/088616
§ 371 (c)(1),
(2) Date: Oct. 23, 2020

(87) PCT Pub. No.: WO2019/228311
PCT Pub. Date: Dec. 5, 2019

(65) Prior Publication Data
US 2021/0095651 A1 Apr. 1, 2021

(30) Foreign Application Priority Data
May 28, 2018 (CN) .......................... 201810519275.4

(51) Int. Cl.
*F04B 35/04* (2006.01)
*F04B 49/06* (2006.01)
(Continued)

(52) U.S. Cl.
CPC .............. *F04B 35/04* (2013.01); *F04B 49/06* (2013.01); *F04B 39/00* (2013.01); *F04C 2/10* (2013.01);
(Continued)

(58) Field of Classification Search
CPC .......... F04B 35/04; F04B 49/06; F04B 39/00; F04C 2/10; F04C 2240/20; F04C 2240/30; F04C 2240/10; F04C 11/008; H02K 11/30
See application file for complete search history.

(56) References Cited

U.S. PATENT DOCUMENTS

| 4,964,788 A | * | 10/1990 | Itameri-Kinter ....... H01R 13/74 439/926 |
| 5,770,902 A | | 6/1998 | Batten et al. |

(Continued)

FOREIGN PATENT DOCUMENTS

| CN | 201064444 A | 10/2007 |
| CN | 203009289 U | 6/2013 |

(Continued)

OTHER PUBLICATIONS

English translation of CN-204290629-U (Year: 2015).*
(Continued)

*Primary Examiner* — Connor J Tremarche
(74) *Attorney, Agent, or Firm* — Crain Caton & James; William P. Jensen

(57) ABSTRACT

Related is an electric oil pump, and the electric oil pump includes a pump housing having an inner pump cavity, where the inner pump cavity includes a first cavity and a second cavity; a first rotor assembly disposed in the first cavity; a stator assembly and a second rotor assembly that are disposed in the second cavity; an electric control board; a supporting member at least partially disposed between the
(Continued)

stator assembly and the electric control board; and a connecting terminal. The electric oil pump can reduce deformation of the connecting terminal when the connecting terminal is respectively connected to the stator assembly and the electric control board.

19 Claims, 11 Drawing Sheets

(51) Int. Cl.
*H02K 11/30* (2016.01)
*F04B 39/00* (2006.01)
*F04C 2/10* (2006.01)

(52) U.S. Cl.
CPC ...... *F04C 2240/20* (2013.01); *F04C 2240/30* (2013.01); *H02K 11/30* (2016.01)

(56) References Cited

U.S. PATENT DOCUMENTS

| | | | |
|---|---|---|---|
| 6,177,741 B1 * | 1/2001 | Lutkenhaus | F04D 13/064 310/91 |
| 8,896,169 B2 * | 11/2014 | Song | H02K 5/207 310/71 |
| 2004/0027014 A1 * | 2/2004 | Weigold | H02K 11/33 310/68 R |
| 2004/0062664 A1 | 4/2004 | Weigold et al. | |
| 2009/0097993 A1 | 4/2009 | Ryu et al. | |

FOREIGN PATENT DOCUMENTS

| | | | |
|---|---|---|---|
| CN | 103443474 A | | 12/2013 |
| CN | 103883495 A | | 6/2014 |
| CN | 204290629 U | * | 4/2015 |
| CN | 106481567 A | | 3/2017 |
| CN | 207363873 U | | 5/2018 |
| CN | 207363874 U | | 5/2018 |
| DE | 10119404 A1 | | 10/2002 |
| EP | 1635069 A1 | | 3/2006 |
| JP | 56113092 A | | 9/1981 |
| JP | 2016217291 A | | 12/2016 |
| JP | 2018061423 A1 | | 4/2018 |
| WO | WO2015/067810 A1 | | 5/2015 |

OTHER PUBLICATIONS

Korean Intellectual Property Office, Notification of Reason for Refusal, Application No. 10-2020-7032855, dated Nov. 29, 2021, 5 pages, Korean Intellectual Property Office, Korea.
Frank Gnuchtel, Communication—Extended European Search Report, Application No. 19811115.5, dated Dec. 8, 2021, 5 pages, European Patent Office, Munich Germany.
Kotoku Yamazaki, Notice of Reasons for Refusal, Application No. 2020-563646, dated Sep. 13, 2021, 4 pages, Japanese Patent Office, Japan.
Cheng Liang, International Search Report for PCT App No. PCT/CN2019/088616, dated Aug. 22, 2019, 4 pages, China National Intellectual Property Administration, China.
Search Report for CN App. No. 201810519275.4, 2 pages, China National Intellectual Property Administration, China.
Bao Ya, First Office Action for CN App. No. 201810519275.4, dated Apr. 10, 2020, 15 pages, China National Intellectual Property Administration, China.

* cited by examiner

ELECTRIC OIL PUMP

This application is a U.S. National Stage Application of PCT Application Serial No. PCT/CN19/88616, filed May 27, 2019, which claims priority to Chinese patent application No. 201810519275.4 filed on May 28, 2018, both of which are incorporated herein by reference in their entirety.

TECHNICAL FIELD

The present disclosure relates to a field of vehicles, for example, an electric oil pump.

BACKGROUND

The vehicle industry is developing rapidly towards vehicle performances being safer, more reliable, more stable, fully automatic intelligentized, environmental protective and energy saving. Thus an electric oil pump is widely used in at least one of a lubrication system and a cooling system of a vehicle, and can well meet requirements of a market.

The electric oil pump mainly serves as a power source for at least one of the lubrication system and the cooling system of the vehicle. The electric oil pump includes a stator assembly and an electric control board. Usually, the stator assembly and the electric control board are electrically connected via a connecting terminal.

SUMMARY

The present disclosure provides an electric oil pump, which facilitates reducing deformation of a connecting terminal caused by the connecting terminal being connected to a stator assembly and an electric control board, respectively.

Provided is an electric oil pump, including a pump housing having an inner pump cavity, where the inner pump cavity includes a first cavity and a second cavity; a first rotor assembly disposed in the first cavity; a stator assembly and a second rotor assembly that are disposed in the second cavity; an electric control board; a supporting member at least partially disposed between the stator assembly and the electric control board, where the supporting member includes a main body portion, where the main body portion includes a first surface and a second surface opposite to the first surface; and a connecting terminal passing through the first surface and the second surface of the main body portion, where the connecting terminal includes a main portion, a first connecting portion, and a second connecting portion, where the main portion is disposed between the first connecting portion and the second connecting portion, and at least partially fitted tightly with the main body portion or at least partially fixed with the main body portion by injection molding; the first connecting portion is configured to at least partially protrude out from the main body portion, the second connecting portion is configured to at least partially protrude out from the main body portion, the first connecting portion is at least partially connected to the stator assembly, and the second connecting portion is at least partially connected to the electric control board.

Since the main portion is at least partially fitted tightly with the main body portion of the supporting member or fixed with the main body portion of the supporting member by injection molding, a circumferential direction of the connecting terminal is supported, which is beneficial to reduce deformation of the connecting terminal when the connecting terminal is connected to the stator assembly and the electric control board, respectively.

DETAILED DESCRIPTION

An electric oil pump in the present embodiment can provide flowing power for a working medium of at least one of a lubrication system and a cooling system of a vehicle.

Figure 1:
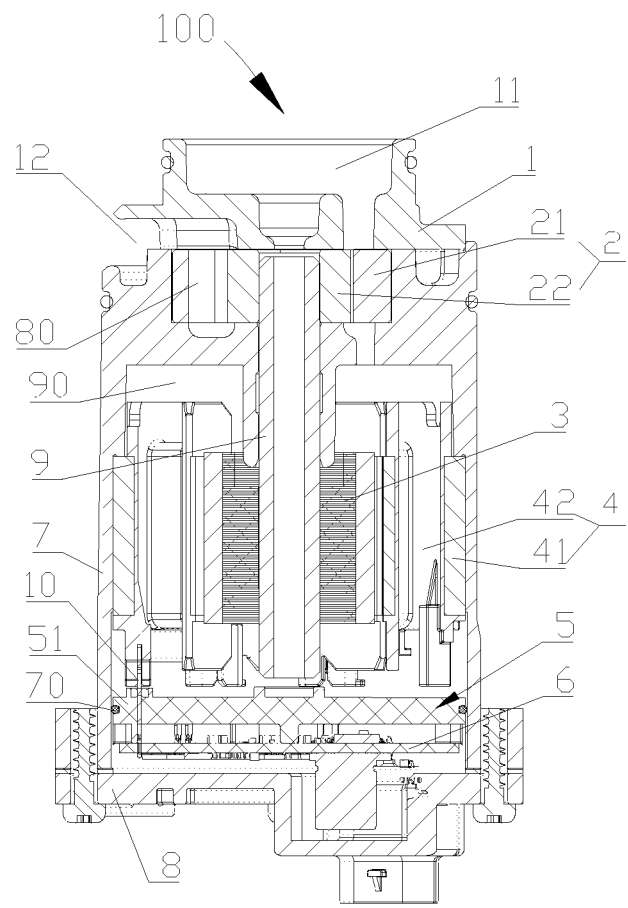
FIG. 1 is a cross-sectional structural schematic view illustrating an electric oil pump in the first implementation manner according to an embodiment.

Referring to FIG. 1, the electric oil pump 100 includes a pump housing, a first rotor assembly 2, a stator assembly 4, a second rotor assembly 3 and an electric control board 6. The pump housing includes an inner pump cavity. The first rotor assembly 2, the stator assembly 4, the second rotor assembly 3 and the electric control board 6 are disposed in the inner pump cavity. In the present embodiment, the inner pump cavity includes a first cavity 80 and a second cavity 90, the first rotor assembly 2 is disposed in the first cavity 80, and the stator assembly 4 and the second rotor assembly 3 are disposed in the second cavity 90. The stator assembly 4 includes a stator iron core 41 and a coil 42. When the electric oil pump 100 is in operation, the electric control board 6 controls current passing through the coil 42 of the stator assembly 4 to vary according to a predetermined rule, so as to control the stator assembly 4 to generate a variable excitation magnetic field; the second rotor assembly 3 rotates under action of the excitation magnetic field, and may directly or indirectly drive the first rotor assembly 2 to rotate; when the first rotor assembly 2 rotates, a volume of a hydraulic cavity in the first rotor assembly 2 varies, so that a working medium is pressed out to an outflow port to generate flowing power.

Referring to FIG. 1, in the present embodiment, the pump housing includes a pump cover 1, a first housing 7 and a second housing 8. The pump cover 1 is fixedly connected to the first housing 7, and the first housing 7 is fixedly connected to the second housing 8. In the present embodiment, the pump cover 1 and the first housing 7 are connected by a screw or a bolt. Such arrangement enables it easier to disassemble and assemble the electric oil pump, thereby facilitating maintenance of the first rotor assembly 2. Apparently, the pump cover 1 and the first housing 7 may also be connected in other manners, such as in a plug-in manner or in a clamping manner. The first housing 7 is fixedly connected to the second housing 8. In an embodiment, the first housing 7 and the second housing 8 are connected by the screw or the bolt. Such arrangement enables it easier to disassemble and assemble the electric oil pump and enables connection between the first housing 7 and the second housing 8 more reliable. In the present embodiment, since the electric control board 6 is disposed in an empty cavity between the first housing 7 and the second housing 8, maintenance of the electric control board 6 is facilitated. The first housing 7 and the second housing 8 may also be connected in a plug-in manner, in a clamping manner or in other manners.

Figure 2:
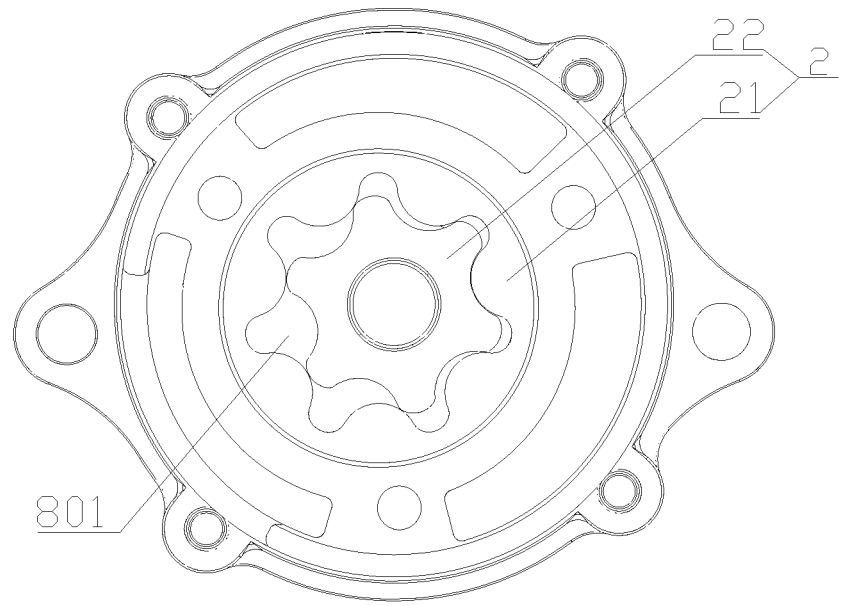
FIG. 2 is a front view illustrating the electric oil pump in FIG. 1 without a pump cover.

Referring to FIG. 2, the first rotor assembly 2 includes a first rotor 21 and a second rotor 22, and the first rotor 21 includes a plurality of internal teeth, and the second rotor 22 includes a plurality of external teeth. A hydraulic cavity 801 is formed between the internal teeth of the first rotor 21 and the external teeth of the second rotor 22. In the present embodiment, the hydraulic cavity 801 is also a part of the first cavity 80. In the present embodiment, the first rotor 21 is sleeved on an outer periphery of the second rotor 22. Still referring to FIG. 1, the electric oil pump further includes an inflow port 11 and an outflow port 12, and the working medium may enter the hydraulic cavity 801 through the inflow port 11 and may exit the hydraulic cavity 801 through the outflow port 12. Since a certain eccentricity exists between the first rotor 21 and the second rotor 22, when the second rotor 22 rotates, part of the external teeth of the second rotor 22 are meshed with part of the internal teeth of the first rotor 21, thereby driving the first rotor 21 to rotate. During rotating the first rotor 21 and the second rotor 22 for one revolution, the volume of the hydraulic cavity 801 changes. In an embodiment, when the first rotor assembly 2 rotates from a starting position to a certain angle, the volume of the hydraulic cavity 801 gradually increases to form a local vacuum, and the working medium is sucked into the hydraulic cavity 801 from the inflow port 11. When the first rotor 21 and the second rotor 22 continue to rotate, the volume of the hydraulic cavity 801 filled with the working medium decreases gradually, and the working medium is squeezed, so that the working medium entering the hydraulic cavity 801 is pressed out to the outflow port 12 to generate the flowing power. In the present embodiment, the electric oil pump 100 further includes a pump shaft 9, and the pump shaft 9 may drive part of the first rotor assembly 2 to rotate. In the present embodiment, the pump shaft 9 may drive the second rotor 22 to rotate, a first end of the pump shaft 9 is connected to the second rotor 22, and a second end of the pump shaft 9 is connected to the second rotor assembly 3. The second rotor assembly 3 drives the second rotor 22 to rotate via the pump shaft 9, so as to rotate the first rotor assembly 2, that is, the second rotor 22 and the first rotor 21 realize transmission through meshing between the internal teeth of the first rotor 21 and the external teeth of the second rotor 22.

Referring to FIG. 1, the electric oil pump 100 further includes a supporting member 5, and at least part of the supporting member 5 is disposed between the stator assembly 4 and the electric control board 6. In the present embodiment, the stator assembly 4 is located on one side of the supporting member 5 where an upper surface of the supporting member 5 is located, and the electric control board 6 is located on one side of the supporting member 5 where a lower surface of the supporting member 5 is located. The electric oil pump 100 includes a connecting terminal 10, the connecting terminal 10 penetrates through the upper and lower surfaces of the supporting member 5 and is fixedly connected to the supporting member 5. A first end of the connecting terminal 10 is connected to the stator assembly 4, and a second end of the connecting terminal 10 is connected to the electric control board 6. The connecting terminal 10 passes through at least part of the supporting member 5 and is fixedly connected to the supporting member 5, which is beneficial to prevent deformation of the connecting terminal 10 when the connecting terminal 10 is connected to the stator assembly 4 and the electric control board 6, respectively, thereby being beneficial to improve reliability of connection between the connecting terminal 10 and the stator assembly 4 and reliability of connection between the connecting terminal 10 and the electric control board 6.

Structures of the supporting members in four implementation manners are described below. In order to facilitate description of the supporting member in the four implementation manners, a supporting member in the first implementation manner is marked as a supporting member 5, and no suffix is added to other labels; a supporting member in the second implementation manner is marked as a supporting member 5a, and the other labels are marked with the suffix a; a supporting member in the third implementation manner is marked as a supporting member 5b, and the other labels are marked with the suffix b; and a supporting member in the fourth implementation manner is marked as a supporting member 5c, and the other labels are marked with the suffix c.

FIG. 1 is a structural schematic view illustrating an electric oil pump in the first implementation manner, and FIGS. 3 to 6 are structural schematic views illustrating a combination of the supporting member and the connecting terminal in FIG. 1. The structure of the supporting member of the electric oil pump in the first implementation manner is described in detail below.

Figure 4:
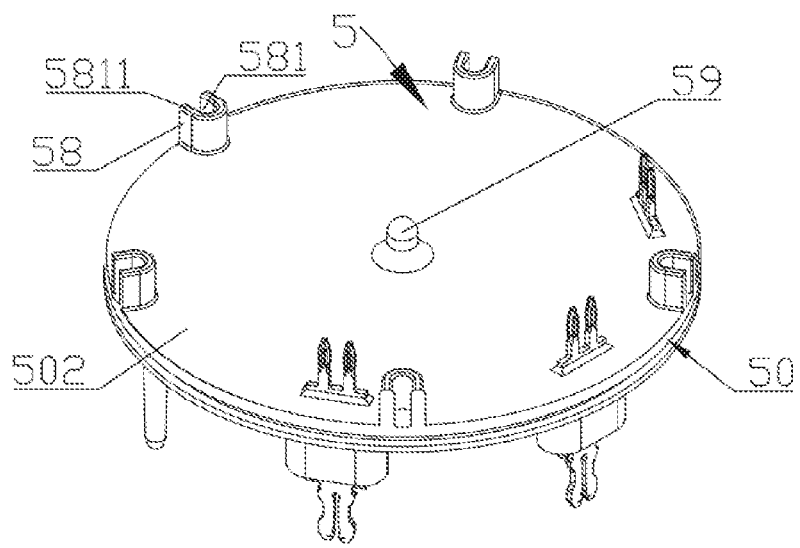
FIG. 4 is a perspective structural schematic view illustrating the supporting member combining with the connecting terminal in FIG. 1 along another direction.
Figure 5:
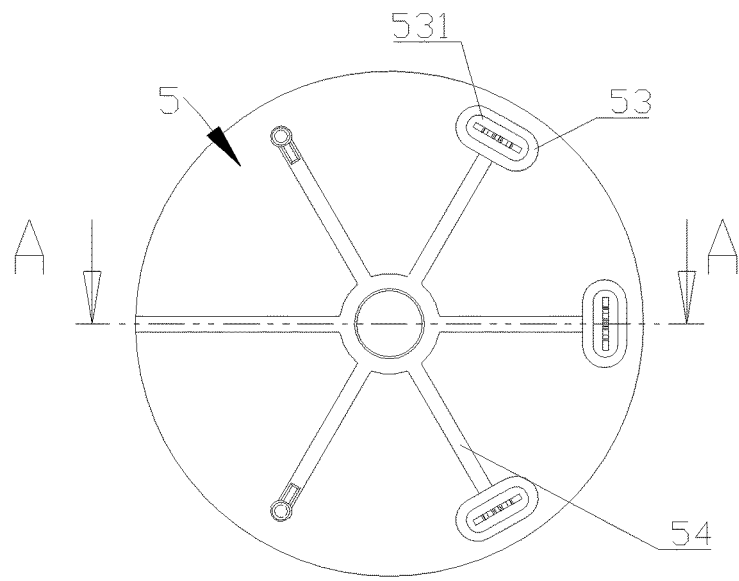
FIG. 5 is a front view illustrating the supporting member combining with the connecting terminal in FIG. 3 or FIG. 4.
Figure 6:
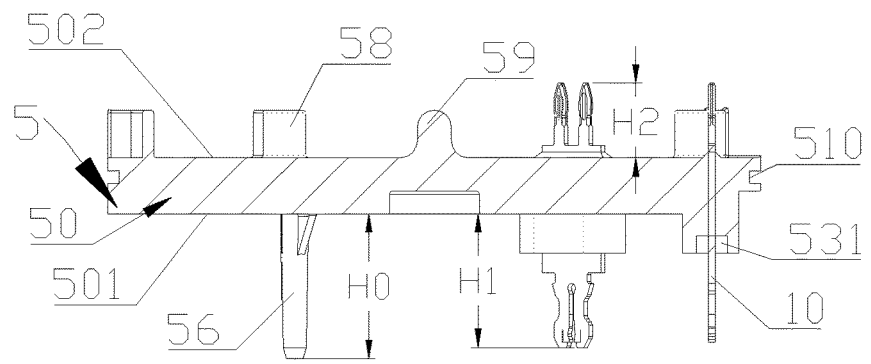
FIG. 6 is a cross-sectional view taken along A-A in FIG. 5.
Figure 7:
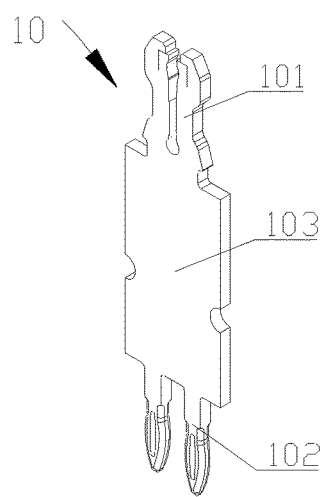
FIG. 7 is a perspective structural schematic view illustrating the connecting terminal in FIG. 1, or FIG. 3, or FIG. 4, or FIG. 5, or FIG. 6.
Figure 8:
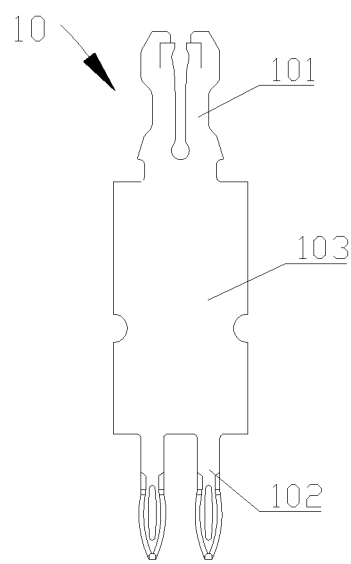
FIG. 8 is a front view illustrating the connecting terminal in FIG. 7.

Referring to FIGS. 3 to 6, the supporting member 5 includes a main body portion 50. The main body portion 50 includes a first surface 501 and a second surface 502 opposite to the first surface 501, and the connecting terminal 10 penetrates through the first surface 501 and the second surface 502 of the main body portion 50. Referring to FIGS. 7 and 8, the connecting terminal 10 includes a main portion 103, a first connecting portion 101 and a second connecting portion 102. The main portion 103 is disposed between the first connecting portion 101 and the second connecting portion 102. Referring to FIG. 6, at least part of the main portion 103 is fitted tightly with the main body portion 50 of the supporting member 5, or at least part of the main portion 103 is fixed with the main body portion 50 of the supporting member 5 by injection molding, that is, at least part of the main portion 103 is embedded in the main body portion 50 in FIG. 6. At least part of the main portion 103 is fixedly connected to the main body portion 50 of the supporting member 5 in FIG. 6. At least part of the first connecting portion 101 extends out of the main body portion 50 of the supporting member 5, and at least part of the second connecting portion 102 extends out of the main body portion 50 of the supporting member 5. Combined with FIG. 1, the main body portion 50 is disposed between the electric control board 6 and the stator assembly 4, at least part of the first connecting portion 101 is connected to the stator assembly 4, and at least part of the second connecting portion 102 is connected to the electric control board 6. Since the part of the main portion 103 is embedded in the main body portion 50 of the supporting member 5 and is fixedly connected to the main body portion 50, a circumferential direction of part of the connecting terminal 10 is supported, which is beneficial to reduce the deformation of the connecting terminal 10 when the connecting terminal 10 is connected to the stator assembly 4 and the electric control board 6, thereby being beneficial to improve the reliability of the connection between the connecting terminal 10 and the stator assembly 4, and the reliability of the connection between the connecting terminal 10 and the electric control board 6.

Referring to FIGS. 3 to 6, the supporting member 5 is made by a non-metallic material. In an embodiment, the supporting member 5 is made by plastic, which may insulate the connecting terminal 10 with the supporting member 5, so as to ensure that the electric oil pump does not conduct electricity through the supporting member 5 during operation of the electric oil pump. In the present embodiment, the connecting terminal 10 serves as an inserting member and the connecting terminal 10 is integrally formed with the supporting member 5 by injection molding. In an embodiment, referring to FIGS. 3 to 6, at least part of the main portion 103 of the connecting terminal 10 in FIG. 7 is fixed to the main body portion 50 of the supporting member 5 by injection molding, so as to realize the fixed connection between the connecting terminal 10 and the supporting member 5. Apparently, the connecting terminal 10 and the supporting member 5 may also be processed separately to form two separate components, and then the connecting terminal 10 and the supporting member 5 may be fixedly connected in other manners such as in a tight fitting manner or in a bonding manner. Referring to FIG. 6, at least one third of the connecting terminal 10 is embedded in the supporting member 5 and fixedly connected to the supporting member 5, so that on one hand, part of the connecting terminal 10 is supported in the circumferential direction of the connecting terminal 10, and on the other hand, a supporting area of the connecting terminal 10 may be relatively increased, so that the deformation of the connecting terminal 10 is reduced when the connecting terminal 10 is connected to the stator assembly 4 and the electric control board 6 in FIG. 1, respectively, thereby being beneficial to improve the reliability of the connection between the connecting terminal 10 and the stator assembly 4, and the reliability of the connection between the connecting terminal 10 and the electric control board 6. Referring to FIG. 1, at least another one third of the connecting terminal 10 is electrically connected to the stator assembly 4, and such arrangement is beneficial to ensure that the stator assembly 4 is in fully contact with the connecting terminal 10, thereby helping to improve reliability of electrical connection between the stator assembly 4 and the connecting terminal 10.

Figure 3:
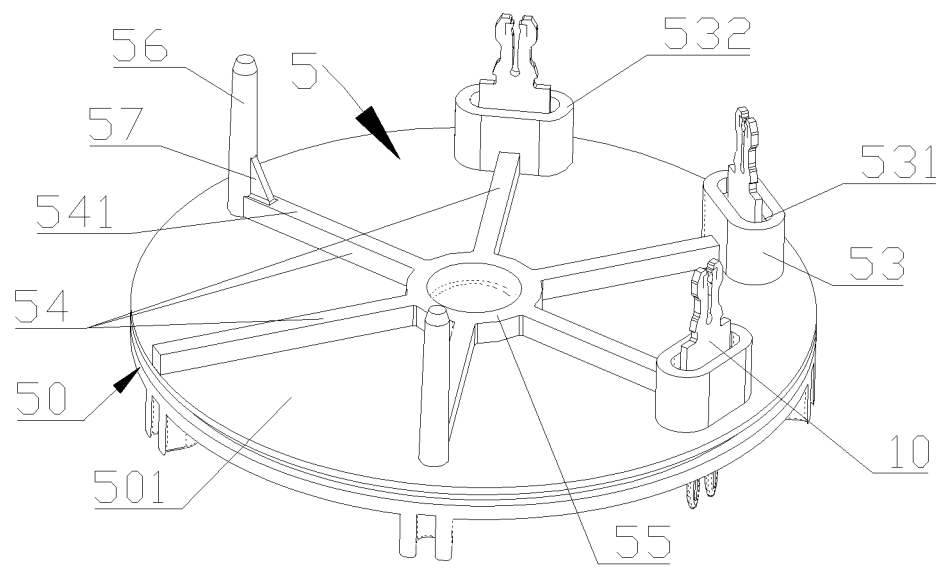
FIG. 3 is a perspective structural schematic view illustrating a supporting member combining with a connecting terminal in FIG. 1 along a direction.

Referring to FIGS. 3 and 6, the supporting member 5 includes first protrusion portions 53 that protrude from the first surface 501 of the main body portion 50 in a direction away from the first surface 501, the first protrusion portions 53 are distributed at intervals along the circumferential direction of the supporting member 5, and each of the connecting terminals 10 passes through a respective one of the first protrusion portions 53. The first protrusion portions 53 each include a groove 531 that is recessed from an upper surface 532 of the first protrusion portion 53 toward the first surface 501 of the main body portion 50, the groove 531 does not penetrate through the second surface 502 of the main body portion 50, and the connecting terminal 10 passes through the respective groove 531. A certain gap is provided between an outer circumference of the connecting terminal 10 disposed in the groove 531 and an inner wall of the groove 531, and the gap is filled with a sealant (not shown in the figure). Combined with FIG. 1, in the present embodiment, when the electric oil pump 100 is in operation, the working medium flows into the second cavity 90, which is conducive to heat dissipation of the stator assembly 4. In order to prevent the working medium from seeping into one side of the supporting member 5 where the electric control board 6 is located from a connection between the connecting terminal 10 and the supporting member 5, the groove 531 is filled with the sealant, which is beneficial to prevent the working medium from seeping into the one side of the supporting member 5 where the electric control board 6 is located from the connection between the connecting terminal 10 and the supporting member 5, thereby ensuring that performance of the electric control board 6 is not damaged. In the present embodiment, the supporting member 5 and the connecting terminal 10 are integrally formed by injection molding to achieve fixed connection between the supporting member 5 and the connecting terminal 10, and then the groove 531 is filled with the sealant to get sealed. Therefore, defects such as blowholes generated in an injection molding process of the components are prevented, thereby preventing the working medium from seeping into the one side of the supporting member 5 where the electric control board 6 is located through the blowholes. On the premise that the injection molding does not cause defects such as blowholes, the connecting terminal 10 may also be directly fixed with the supporting member 5 by injection molding to achieve sealing. At this moment, the groove 531 is no longer needed and the groove 531 does not need to be filled with the sealant to get sealed. In the present embodiment, a height of solidified sealant is greater than or equal to a depth of the groove 531, that is, the solidified sealant overflows the groove 531, which is conducive to fully ensuring sealing performance. In addition, in the present embodiment, the supporting member 5 is provided with the first protrusion portion 53, where the groove 531 is formed in the first protrusion portion 53. In other embodiments, according to a position of the connecting terminal 10, the first protrusion portion 53 may not be provided, in contrast the groove 531 may be directly formed on the first surface 501 of the main body portion 50.

Referring to FIGS. 3 and 5, the supporting member 5 includes a plurality of first reinforcing ribs 54, and each of the plurality of first reinforcing ribs protrudes from the first surface 501 of the main body portion 50 toward a direction away from the first surface 501. In the present embodiment, the supporting member 5 includes six first reinforcing ribs 54 and a second protrusion portion 55. The second protrusion portion 55 is arranged to protrude out from the first surface 501 of the main body portion 50 toward the direction away from the first surface 501, and the second protrusion portion 55 is arranged closer to a center of the supporting member 5 than the first protrusion portions 53. The six first reinforcing ribs 54 are distributed in a circumferential array or at intervals along a circumferential direction of the second protrusion portion 55, at least part of the six first reinforcing ribs 54 are arranged to connect the first protrusion portions 53 with the second protrusion portion 55, and such arrangement is beneficial to improve structural strength of the main body portion of the supporting member, thereby helping to prevent deformation of the main body portion 50 of the supporting member 5. In the present embodiment, the second protrusion portion 55 has a circular ring shape, and the second protrusion portion 55 is connected to one ends of the six first reinforcing ribs 54. In other embodiments, the second protrusion portion 55 may also has other closed or non-closed structure formed of polygons.

Referring to FIG. 3, the supporting member 5 includes a positioning portion 56. In an axial direction of the supporting member 5, the positioning portion 56 is arranged to protrude out from the first surface 501 of the main body portion 50 toward the direction away from the first surface 501. Referring to FIG. 6, a distance between one end of the connecting terminal 10 adjacent to the first surface 501 and the first surface 501 is defined as a first distance H1, and a vertical distance H0 between the positioning portion 56 and the first surface 501 is greater than the first distance H1. In the present embodiment, the positioning portion 56 is provided to facilitate positioning for the supporting member 5 and the stator assembly 4 when the supporting member 5 is assembled with the stator assembly 4, thereby preventing the supporting member 5 from being misassembled during the assembly. The vertical distance H0 between the positioning portion 56 and the first surface 501 is greater than the first distance H1, which may prevent the connecting terminal 10 from causing structural interference to the positioning of the positioning portion 56 when the supporting member 5 is assembled. In the present embodiment, the supporting member 5 includes two positioning portions 56, and the positioning portions 56 each have a cylindrical shape. In other embodiments, the positioning portions 56 may also be square, D-shaped, circular-ring shaped, or other special-shaped structures.

Figure 9:
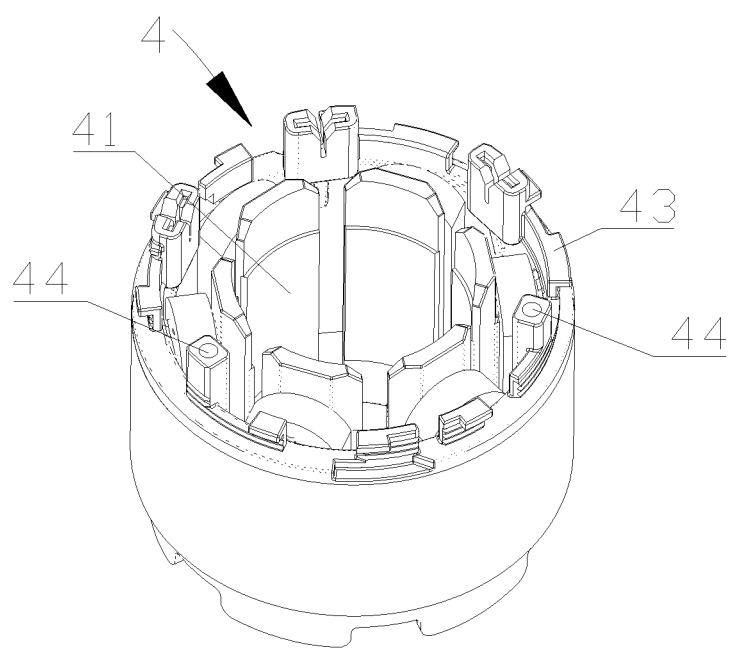
FIG. 9 is a perspective structural schematic view illustrating a stator assembly in FIG. 1.

Referring to FIG. 9, the stator assembly 4 includes the stator iron core 41 and an insulating frame 43. In the present embodiment, the stator iron core 41 is used as an injection molding inserting member, and the stator iron core 41 and the insulating frame 43 are integrally formed by injection molding. The insulating frame 43 includes positioning holes 44, and a number of the positioning holes 44 is equal to a number of the positioning portions 56 of the supporting member. Combined with FIG. 1, when the supporting member 5 is assembled with the stator assembly 4, each of the positioning holes 44 of the stator assembly 4 is arranged corresponding to a respective one of the positioning portions 56 of the supporting member 5. In an embodiment, each of the positioning portions 56 of the supporting member 5 is inserted into a respective one of the positioning holes 44 of the stator assembly, thereby facilitating positioning of the supporting member 5 and the stator assembly 4 when the supporting member 5 and the stator assembly 4 are assembled, and preventing the supporting member 5 from being misassembled. Referring to FIG. 3, the supporting member 5 includes second reinforcing ribs 57 that connect the positioning portions 56 with the respective first reinforcing rib 54, which is beneficial to improve structural strength of the positioning portion 56. In the present embodiment, each of the second reinforcing ribs 57 is arranged to protrude out from an upper surface 541 of the first reinforcing rib 54 toward a direction away from the upper surface 541 of the first reinforcing rib 54. The second reinforcing ribs 57 each are triangular-shaped, and the second reinforcing ribs 57 connect the upper surfaces 541 of the respective first reinforcing ribs 54 and cylindrical surfaces of the respective positioning portions 56. In other embodiments, the second reinforcing ribs 57 may also be other shapes such as a quadrangle. Referring to FIGS. 4 to 6, the supporting member 5 includes at least two third protrusion portions 58, the two third protrusion portions 58 each protrude out from the second surface 502 of the main body portion 50 toward a direction away from the second surface 502, and the two third protrusion portions 58 are distributed at an interval along the circumferential direction of the supporting member 5. In the present embodiment, the supporting member 5 includes five third protrusion portions 58. Referring to FIG. 1, the five third protrusion portions 58 may provide support to the electric control board 6 in FIG. 1. Referring to FIG. 6, a vertical distance between one end of the connecting terminal 10 adjacent to the second surface 502 and the second surface 502 is defined as a second distance H2, and a protrusion height of the third protrusion portion 58 is less than the second distance H2. With reference to FIG. 1, through such arrangement, one end of the connecting terminal 10 first passes through the electric control board 6 in FIG. 1, and then the electric control board 6 in FIG. 1 is supported via the third protrusion portions 58, thereby effectively preventing the third protrusion portions 58 from causing structural interference when the supporting member 5 is assembled with the electric control board 6 in FIG. 1, so as to enable the connecting terminal 10 to be reliably connected to the electric control board 6 in FIG. 1. Referring to FIG. 4, in the present embodiment, the third protrusion portion 58 includes a hollow portion 581 that is hollowly disposed from an upper end surface 5811 of the third protrusion portion 58 toward the second surface 502. Such arrangement, on one hand, is beneficial to reduce weight of the supporting member, and on the other hand, is beneficial to ensure that wall thickness of the third protrusion portion 58 does not differ too much from wall thicknesses of the other parts of the supporting member 5, thereby beneficial to reduce generation of air holes or deformation of the supporting member 5 during the injection molding process of the supporting member 5. In the present embodiment, the third protrusion portion 58 is U-shaped. In other embodiments, the third protrusion portion 58 may also be cylindrical or square or D-shaped or circular ring-shaped or a combination of the foregoing shapes. etc.

Referring to FIGS. 4 and 6, the supporting member 5 includes a fourth protrusion portion 59 that is arranged to protrude out from the second surface 502 of the main body portion 50 toward a direction away from the second surface 502. The fourth protrusion portion 59 is disposed closer to the center of the supporting member 5 than the third protrusion portions 58, and a protrusion height of the fourth protrusion portion 59 is less than the second distance H2. Such arrangement is beneficial to prevent the fourth protrusion portion 59 from causing structural interference when the supporting member 5 is assembled with the electric control board 6, so as to enable the connecting terminal 10 to be reliably connected to the electric control board 6 in FIG. 1. In the present embodiment, the fourth protrusion 59 is formed at the center of the supporting member 5. Apparently, due to manufacturing and processing errors, it is difficult to ensure that the fourth protrusion portion 59 is fully formed at the center of the supporting member 5. In the present embodiment, the fourth protrusion portion 59 formed within a processing error range is within a protection scope of the present application. Referring to FIG. 1, in the present embodiment, the fourth protrusion portion 59 may provide support to a central side of the electric control board 6 in FIG. 1, and such arrangement is beneficial to prevent deformation of the electric control board 6 such as a central depression during the assembly of the electric control board 6.

Referring to FIG. 6, the supporting member 5 includes a slot 510 that is circumferentially arranged along an outer peripheral side wall of the supporting member 51. Referring to FIG. 1, the electric oil pump 100 includes a seal ring 70, and at least part of the seal ring 70 is disposed in the slot 510. Referring to FIG. 1, such arrangement may prevent the working medium in the second cavity 90 from seeping into the one side of the supporting member 5 where the electric control board 6 is located through a gap between the outer peripheral side wall of the supporting member 5 and an inner peripheral side wall of the first housing 7.

Figure 10:
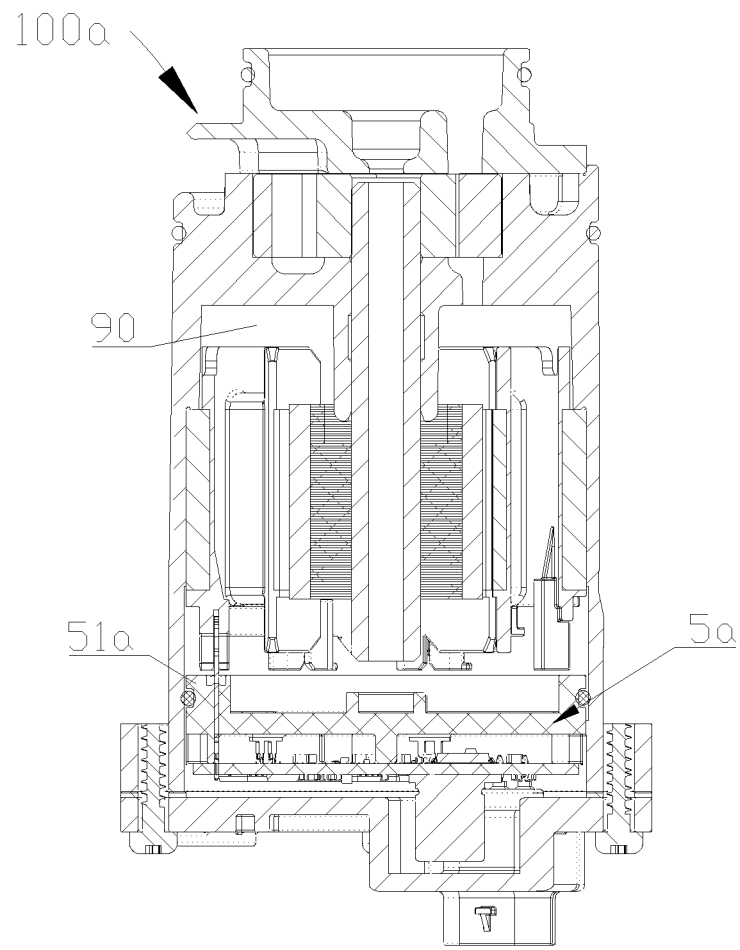
FIG. 10 is a cross-sectional view illustrating an electric oil pump in the second implementation manner the according to an embodiment.

FIG. 10 is a structural schematic view illustrating an electric oil pump in the second implementation manner, and FIGS. 11 to 14 are structural schematic views illustrating the supporting member in FIG. 10. The structure of the supporting member of the electric oil pump in the second implementation manner is described in detail below.

Figure 11:
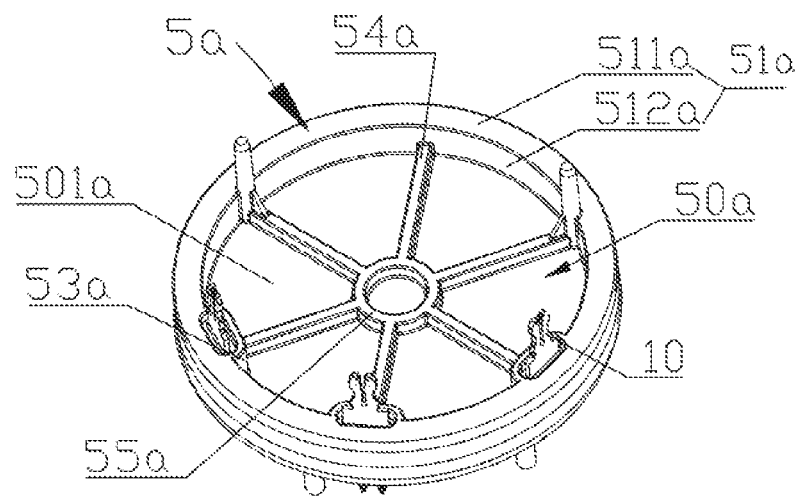
FIG. 11 is a perspective structural schematic view illustrating the supporting member combining with the connecting terminal in FIG. 10 along a direction.
Figure 12:
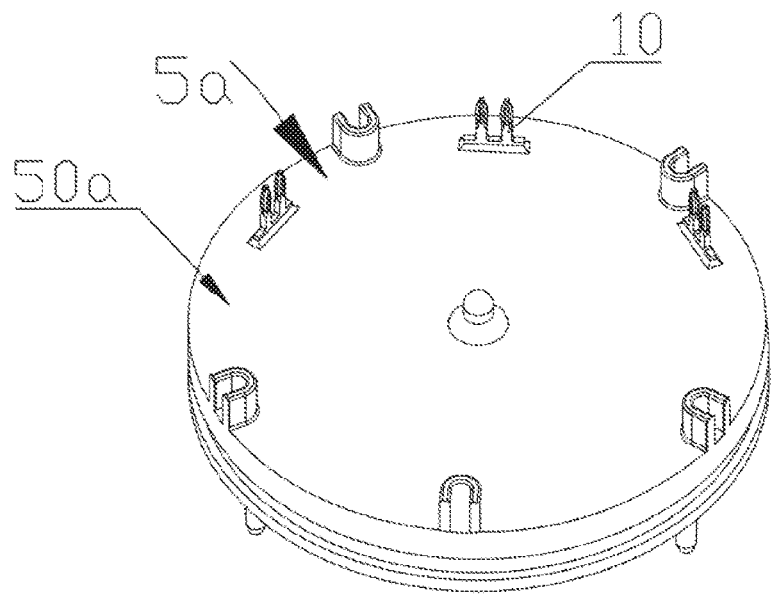
FIG. 12 is a perspective structural schematic view illustrating the supporting member combining with the connecting terminal in FIG. 10 along another direction.
Figure 13:
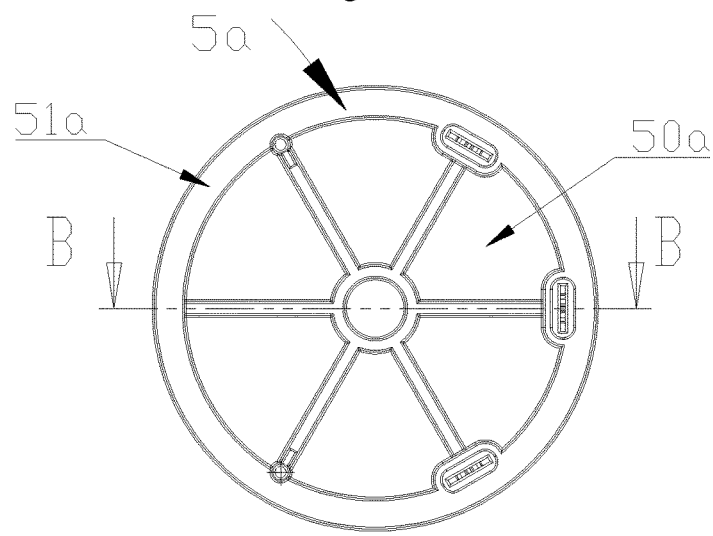
FIG. 13 is a front view illustrating the supporting member combining with the connecting terminal FIG. 11 or FIG. 12.
Figure 14:
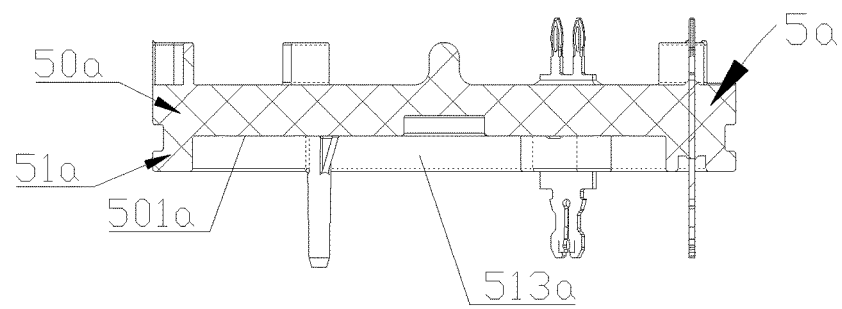
FIG. 14 is a cross-sectional view taken along B-B in FIG. 13.

Referring to FIGS. 11 to 14, the supporting member 5a includes a main body portion 50a and a first end portion 51a that are integrally formed. The first end portion 51a is arranged to protrude out from a first surface 501a of the main body portion 50a toward a direction away from the first surface 501a. A first hollow cavity 513a is formed by an inner peripheral side wall of the first end portion 51a and the first surface 501a of the main body portion 50a, and is a part of the second cavity 90 in FIG. 10. In the present embodiment, first protrusion portions 53a are integrally formed with the first end portion 51a. The first protrusion portions 53a are distributed at intervals along a circumferential direction of the supporting member 5a. In an axial direction of the supporting member 5a, the first protrusion portions 53a are arranged to protrude out from the first surface 501a of the main body portion 50a toward a direction away from the first surface 501a. In a radial direction of the supporting member 5a, the first protrusion portions 53a are arranged to protrude out from an inner peripheral side walls 512a of the first end portions 51a toward a central axis of the supporting member 5a. In the present embodiment, the first end portion 51a further includes a top surface 511a, and upper surfaces of the first protrusion portions 53a are flush with the top surface 511a, and such arrangement facilitates processing. Referring to FIG. 11, at least part of first reinforcing ribs 54a connect the inner peripheral side wall 512a of the first end portion 51a and a second reinforcing rib 55a, and such arrangement is beneficial to improve structural strength of the first end portion 51a.

Compared with the electric oil pump and the supporting member in the first implementation manner, the supporting member 5a in the present embodiment includes a first end portion 51a that is integrally formed with the main body portion 50a. Referring to FIG. 1, in the present embodiment, the first end portion 51a is provided so that when the supporting member 5a is assembled, the top surface 511a of the first end portion 51a may be in contact with the stator assembly 4 to achieve axial limit of the supporting member 5. For other features of the electric oil pump and the supporting member in the present embodiment, reference may be made to the electric oil pump and the supporting member in the first implementation manner, and details are not described herein again.

Figure 15:
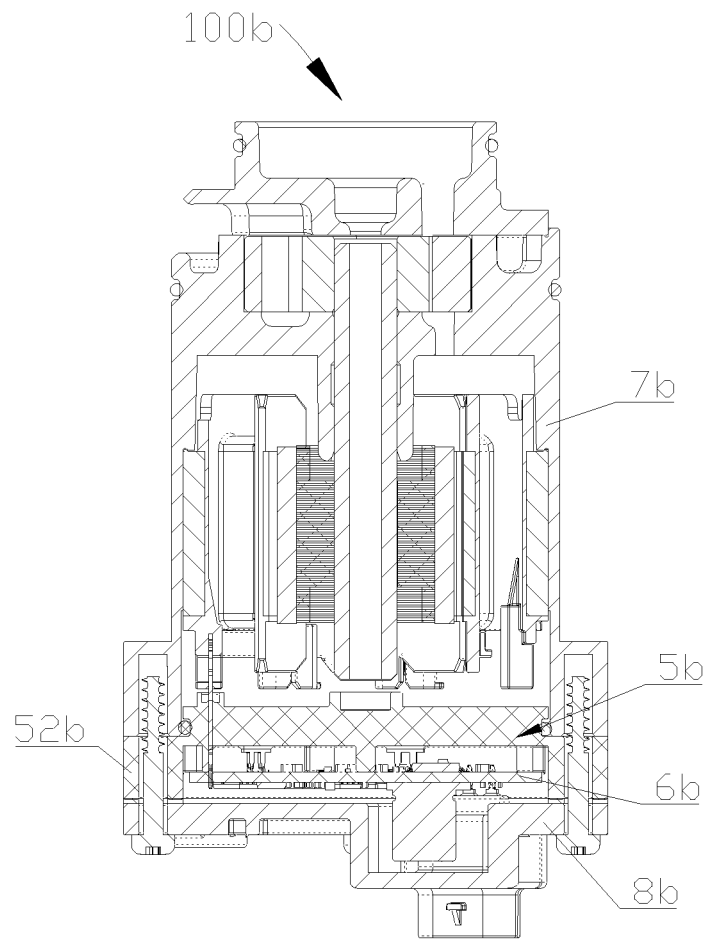
FIG. 15 is a cross-sectional view illustrating the electric oil pump in a third implementation manner according to an embodiment.
Figure 16:
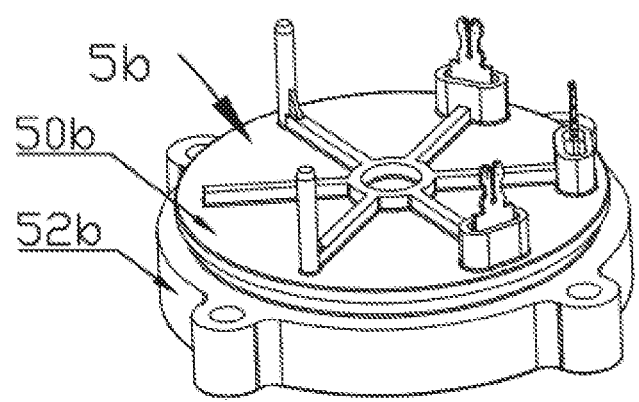
FIG. 16 is a perspective structural schematic view illustrating the supporting member combining with the connecting terminal in FIG. 15 along a direction.

FIG. 15 is a structural schematic view illustrating an electric oil pump in the third implementation manner, and FIGS. 16 to 19 are structural schematic views illustrating the supporting member in FIG. 15. The structure of the supporting member of the electric oil pump in the third implementation manner is described in detail below.

Figure 17:
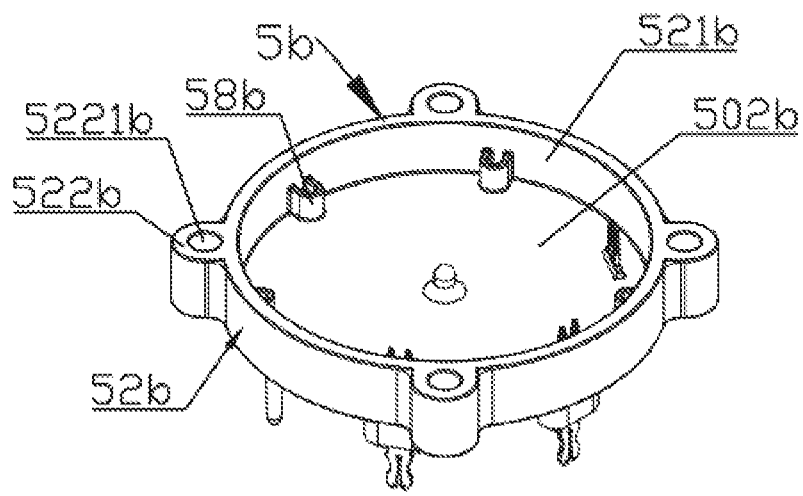
FIG. 17 is a perspective structural schematic view illustrating the supporting member combining with the connecting terminal in FIG. 15 along another direction.
Figure 18:
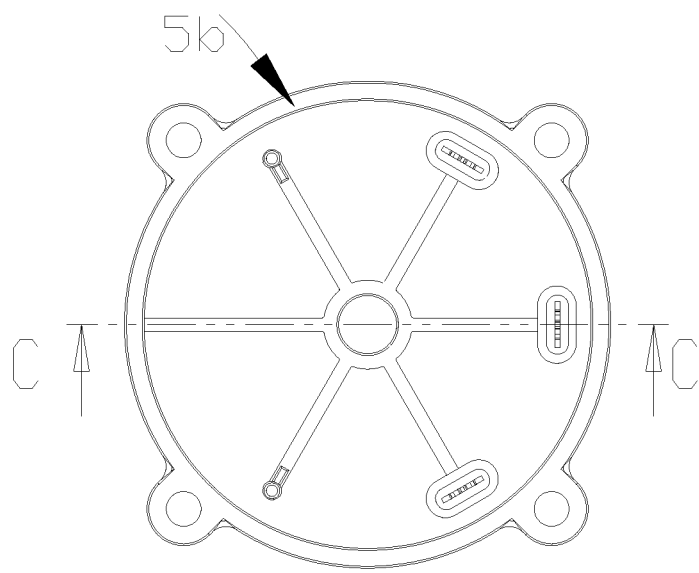
FIG. 18 is a front view illustrating the supporting member combining with the connecting terminal in FIG. 16 or FIG. 17.
Figure 19:
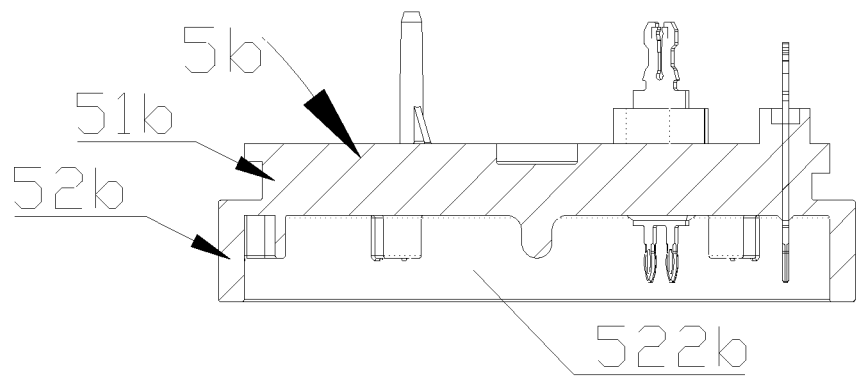
FIG. 19 is a cross-sectional view taken along C-C in FIG. 18.

Referring to FIGS. 16 to 19, the supporting member 5b includes a main body portion 50b and a second end portion 52b. In the present embodiment, the second end portion 52b is integrally formed with the main body portion 50b, and arranged to protrude out from a second surface 502b of the main body portion 50b toward a direction away from the second surface 502b. A second hollow cavity 522b is formed by an inner peripheral side wall 521b of the second end portion 52b and the second surface 502b of the main body portion 50b. Referring to FIG. 15, at least part of the electric control board 6 is located in the second hollow cavity 522b, and such arrangement is beneficial to reduce an overall height of the electric oil pump. Referring to FIG. 17, in an axial direction of the supporting member 5b, third protrusion portions 58b are arranged to protrude out from the second surface 502b of the main body portion along the inner peripheral side wall 521b of the second end portion 52b.

Referring to FIG. 15, the electric oil pump 100b includes a first housing 7b and a second housing 8b. The second end portion 52b is located between the first housing 7b and the second housing 8b, and the supporting member 5b is detachably connected to the first housing 7b and the second housing 8b, respectively. In other embodiments, the supporting member 5b is detachably connected to the first housing 7b and the second housing 8b via the second end portion 52b. The second end portion 52b includes a connecting portion 522b, and the connecting portion 522b is formed with a connecting hole 5221b, where the connecting hole 5221b is a through hole. Referring to FIG. 15, the second end portion 52b is detachably connected to the first housing 7b and the second housing 8b by a screw or a bolt, respectively, and the screw or bolt penetrates the connecting hole of the second end portion 52b and the connecting hole of the first housing 7b in sequence from the connecting hole of the second housing 8b.

Compared with the electric oil pump and the supporting member in the first implementation manner, the supporting member 5b in the present embodiment further includes the second end portion 52b that is integrally formed with the main body portion 50b, and the supporting member 5b is detachably connected to the first housing 7b and the second housing 8b via the second end portion 52b. Compared with the electric oil pump and the supporting member in the first implementation manner, the supporting member in the present embodiment is detachably connected to the first housing and the second housing by a screw or a bolt. Such connecting manner is simpler and more conducive to assembly. For other features of the electric oil pump and the supporting member in the present embodiment, reference may be made to the electric oil pump and the supporting member in the first implementation manner, and details are not described herein again.

Figure 20:
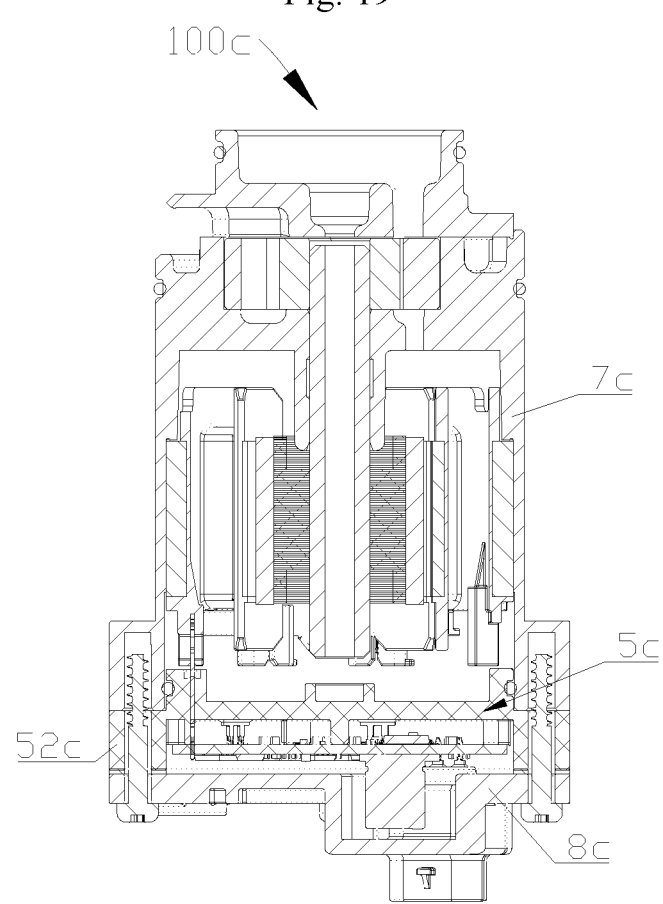
FIG. 20 is a cross-sectional view illustrating an electric oil pump in the fourth implementation manner according to an embodiment.
Figure 21:
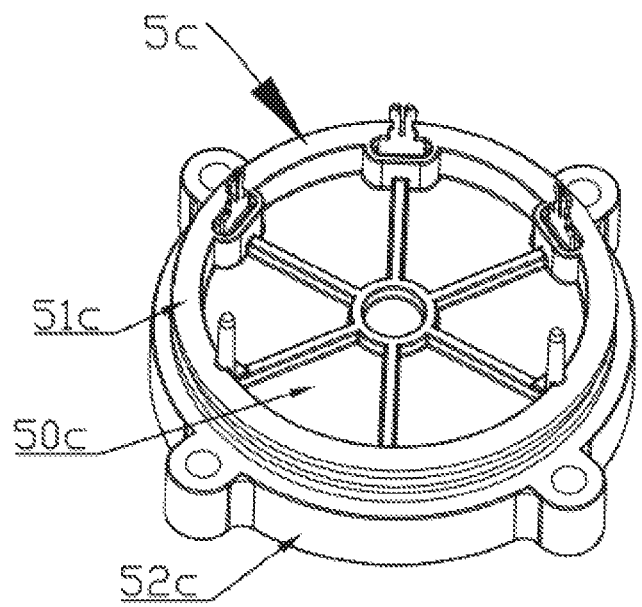
FIG. 21 is a perspective structural schematic view illustrating the supporting member combining with the connecting terminal in FIG. 20 along a direction.
Figure 22:
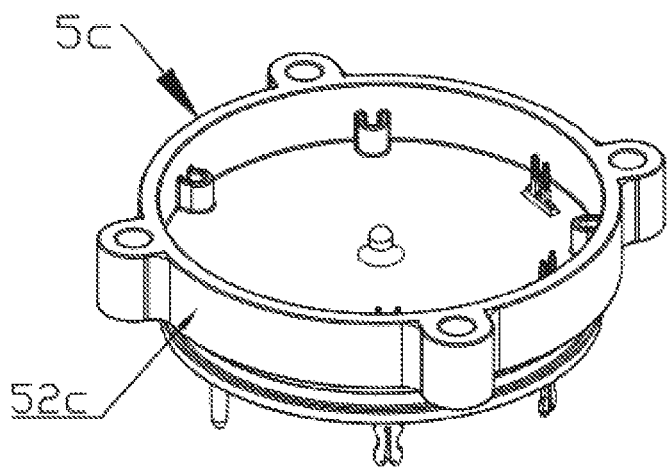
FIG. 22 is a perspective structural schematic view illustrating the supporting member combining with the connecting terminal in FIG. 20 along another direction.
Figure 23:
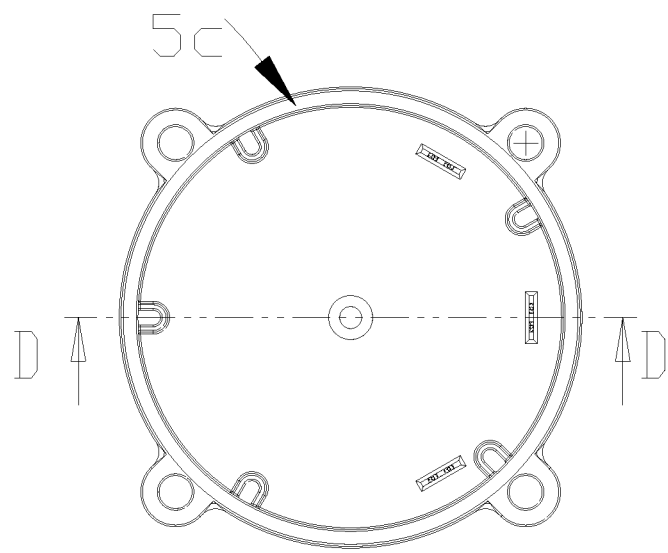
FIG. 23 is a front view illustrating the supporting member combining with the connecting terminal in FIG. 21 or FIG. 22.
Figure 24:
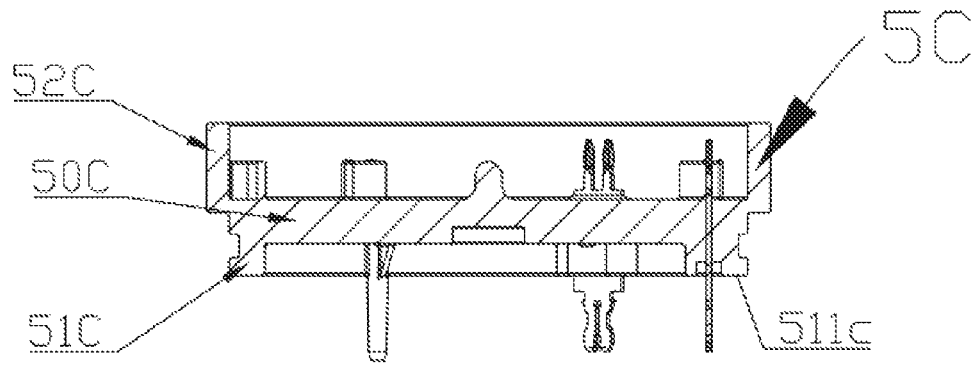
FIG. 24 is a cross-sectional view taken along D-D in FIG. 23.

FIG. 20 is a structural schematic view illustrating an electric oil pump in the fourth implementation manner, and FIGS. 21 to 24 are structural schematic views illustrating the supporting member in FIG. 20. The structure of the supporting member of the electric oil pump in the fourth implementation manner is described in detail below.

Referring to FIGS. 21 to 24, the supporting member 5c includes a main body portion 50c, a first end portion 51c, and a second end portion 52c, and the main body portion 50c, the first end portion 51c, and the second end portion 52c are integrally formed. For structures of the first end portion 51c and the second end portion 52c, reference may be made to the supporting member in the second implementation manner and the third implementation manner, and details are not described herein again. Referring to FIG. 20, the electric oil pump 100c includes a first housing 7c and a second housing 8c, where the second end portion 52c is located between the first housing 7c and the second housing 8c, and the supporting member 5c is detachably connected to the first housing 7c and the second housing 8c. In other embodiments, the supporting member 5c is detachably connected to the first housing 7c and the second housing 8c via the second end portion 52c.

Compared with the electric oil pump and the supporting member in the first implementation manner, the supporting member 5c in the present embodiment further includes the first end portion 51c and the second end portion 52c, where the main body portion 50c, the first end portion 51c and the second end portion 52c are integrally formed, and the supporting member 5c is detachably connected to the first housing 7c and the second housing 8c via the second end portion 52c. Compared with the electric oil pump and the supporting member in the first implementation manner, on one hand, the first end portion 51c in the present embodiment is provided to improve the structural strength of the supporting member, and on the other hand, the supporting member 51c in the present embodiment is detachably connected to the first housing 7c and the second housing 8c by a screw or a bolt. Such connecting manner is simpler and more conducive to assembly. For other features of the electric oil pump and the supporting member in the present embodiment, reference may be made to the electric oil pump and the supporting member in the first, second and third implementation manners, and details are not described herein again.

What is claimed is:

1. An electric oil pump, comprising:
 a pump housing having an inner pump cavity, wherein the inner pump cavity comprises a first cavity and a second cavity;
 a first rotor assembly disposed in the first cavity;
 a stator assembly and a second rotor assembly, which are disposed in the second cavity;
 an electric control board;
 a supporting member at least partially disposed between the stator assembly and the electric control board, wherein the supporting member comprises a main body portion, wherein the main body portion comprises a first surface and a second surface opposite to the first surface; and
 a connecting terminal passing through the first surface and the second surface of the main body portion,
 wherein the connecting terminal comprises a main portion, a first connecting portion, and a second connecting portion, wherein the main portion is disposed between the first connecting portion and the second connecting portion, and at least partially fitted tightly with the main body portion or at least partially fixed with the main body portion by injection molding; the first connecting portion is configured to at least partially protrude out from the main body portion, the second connecting portion is configured to at least partially protrude out from the main body portion, the first connecting portion is at least partially connected to the stator assembly, and the second connecting portion is at least partially connected to the electric control board;
 wherein the supporting member further comprises a plurality of first reinforcing ribs, the plurality of first reinforcing ribs are configured to protrude out from the first surface of the main body portion toward the direction away from the first surface;
 wherein the supporting member further comprises a positioning portion disposed on an axial direction of the supporting member, and the positioning portion is configured to protrude out from the first surface of the main body portion toward the direction away from the first surface; and
 wherein the supporting member further comprises a second reinforcing rib connecting the positioning portion and a respective one of the plurality of first reinforcing ribs, and the second reinforcing rib is configured to protrude out from an upper surface of the respective one of the plurality of first reinforcing ribs toward a direction away from the upper surface of the respective one of the plurality of first reinforcing ribs in an axial direction of the positioning portion.

2. The electric oil pump according to claim 1, wherein the main body portion is disposed between the electric control board and the stator assembly, the supporting member further comprises a first end portion and a first hollow cavity; wherein the first end portion is integrally formed with the main body portion, and configured to protrude out from the first surface of the main body portion toward a direction away from the first surface, and the first hollow cavity is formed by an inner peripheral side wall of the first end portion and the first surface of the main body portion, and is a part of the second cavity.

3. The electric oil pump according to claim 2, wherein the supporting member further comprises a second end portion and a second hollow cavity,
 wherein the second end portion is integrally formed with the main body portion, and configured to protrude out from the second surface of the main body portion toward a direction away from the second surface, and the second hollow cavity is located between an inner peripheral side wall of the second end portion and the second surface of the main body portion.

4. The electric oil pump according to claim 3, wherein the pump housing comprises a first housing and a second housing, the second end portion is located between the first housing and the second housing, and the supporting member is detachably connected to the first housing and the second housing, respectively.

5. The electric oil pump according to claim 4, wherein the supporting member comprises first protrusion portions,
the first protrusion portions are configured to protrude out from the first surface of the main body portion toward a direction away from the first surface, and the first protrusion portions are distributed at intervals along a circumferential direction of the first surface, and the connecting terminal is configured to pass through a respective one of the first protrusion portions;
each of the first protrusion portions is provided with a groove, the groove is configured to be recessed from an upper surface of the each first protrusion portions toward the first surface of the main body portion, and does not pass through the second surface of the main body portion;
the connecting terminal is configured to pass through a groove of the respective one of the first protrusion portions, and a sealant is filled between an outer periphery of the connecting terminal disposed in the groove and an inner wall of the groove.

6. The electric oil pump according to claim 3, wherein the supporting member comprises first protrusion portions,
the first protrusion portions are configured to protrude out from the first surface of the main body portion toward a direction away from the first surface, and the first protrusion portions are distributed at intervals along a circumferential direction of the first surface, and the connecting terminal is configured to pass through a respective one of the first protrusion portions;
each of the first protrusion portions is provided with a groove, the groove is configured to be recessed from an upper surface of the each first protrusion portions toward the first surface of the main body portion, and does not pass through the second surface of the main body portion;
the connecting terminal is configured to pass through a groove of the respective one of the first protrusion portions, and a sealant is filled between an outer periphery of the connecting terminal disposed in the groove and an inner wall of the groove.

7. The electric oil pump according to claim 2, wherein the supporting member comprises first protrusion portions,
the first protrusion portions are configured to protrude out from the first surface of the main body portion toward a direction away from the first surface, and the first protrusion portions are distributed at intervals along a circumferential direction of the first surface, and the connecting terminal is configured to pass through a respective one of the first protrusion portions;
each of the first protrusion portions is provided with a groove, the groove is configured to be recessed from an upper surface of the each first protrusion portions toward the first surface of the main body portion, and does not pass through the second surface of the main body portion;
the connecting terminal is configured to pass through a groove of the respective one of the first protrusion portions, and a sealant is filled between an outer periphery of the connecting terminal disposed in the groove and an inner wall of the groove.

8. The electric oil pump according to claim 2, wherein the supporting member further comprises a positioning portion disposed on an axial direction of the supporting member, and the positioning portion is configured to protrude out from the first surface of the main body portion toward the direction away from the first surface;
a vertical distance between one end of the connecting terminal adjacent to the first surface and the first surface is a first distance, and a vertical distance between the positioning portion and the first surface is greater than the first distance.

9. The electric oil pump according to claim 1, wherein the supporting member is made of a non-metallic material, the supporting member is integrally formed with the connecting terminal by injection molding through using the connecting terminal as an inserting member;
at least one third of the connecting terminal is configured to be embedded in the supporting member and fixedly connected to the supporting member, and at least another one third of the connecting terminal is electrically connected to the stator assembly.

10. The electric oil pump according to claim 9, wherein the supporting member comprises first protrusion portions,
the first protrusion portions are configured to protrude out from the first surface of the main body portion toward a direction away from the first surface, and the first protrusion portions are distributed at intervals along a circumferential direction of the first surface, and the connecting terminal is configured to pass through a respective one of the first protrusion portions;
each of the first protrusion portions is provided with a groove, the groove is configured to be recessed from an upper surface of the each first protrusion portion toward the first surface of the main body portion, and does not pass through the second surface of the main body portion;
the connecting terminal is configured to pass through a groove of the respective one of the first protrusion portions, and a sealant is filled between an outer periphery of the connecting terminal disposed in the groove and an inner wall of the groove.

11. The electric oil pump according to claim 10, wherein the supporting member further comprises a second protrusion portion,
the second protrusion portion is configured to protrude out from the first surface of the main body portion toward the direction away from the first surface, and is closer to a center of the supporting member than the first protrusion portions;
the plurality of first reinforcing ribs are distributed in a circumferential array or at intervals along a circumferential direction of the second protrusion portion, and at least part of the plurality of first reinforcing ribs are configured to connect the first protrusion portions with the second protrusion portion.

12. The electric oil pump according to claim 11, wherein a vertical distance between one end of the connecting terminal adjacent to the first surface and the first surface is a first distance, and a vertical distance between the positioning portion and the first surface is greater than the first distance.

13. The electric oil pump according to claim 1, wherein the supporting member comprises first protrusion portions, the first protrusion portions are configured to protrude out from the first surface of the main body portion toward a direction away from the first surface, and the first protrusion portions are distributed at intervals along a circumferential direction of the first surface, and the connecting terminal is configured to pass through a respective one of the first protrusion portions;

each of the first protrusion portions is provided with a groove, the groove is configured to be recessed from an upper surface of the each first protrusion portions toward the first surface of the main body portion, and does not pass through the second surface of the main body portion;

the connecting terminal is configured to pass through a groove of the respective one of the first protrusion portions, and a sealant is filled between an outer periphery of the connecting terminal disposed in the groove and an inner wall of the groove.

14. The electric oil pump according to claim 13, wherein the supporting member comprises a first end portion, the first end portion is integrally formed with the main body portion, and configured to protrude out from the first surface of the main body portion toward the direction away from the first surface;

the first protrusion portion is integrally formed with the first end portion, configured to protrude out from the first surface of the main body portion toward the direction away from the first surface in an axial direction of the supporting member, and configured to protrude out from an inner peripheral side wall of the first end portion toward a central axis of the supporting member in a radial direction of the supporting member.

15. The electric oil pump according to claim 14, wherein the supporting member further comprises a second protrusion portion and a plurality of first reinforcing ribs, the plurality of first reinforcing ribs are configured to protrude out from the first surface of the main body portion toward the direction away from the first surface;

the second protrusion portion is configured to protrude out from the first surface of the main body portion toward the direction away from the first surface, and is closer to a center of the supporting member than the first protrusion portion;

the plurality of first reinforcing ribs are distributed in a circumferential array or at intervals along a circumferential direction of the second protrusion portion, and at least part of the plurality of first reinforcing ribs are configured to connect the first protrusion portions with the second protrusion portion.

16. The electric oil pump according to claim 1, wherein the supporting member further comprises a positioning portion disposed on an axial direction of the supporting member, and the positioning portion is configured to protrude out from the first surface of the main body portion toward the direction away from the first surface;

a vertical distance between one end of the connecting terminal adjacent to the first surface and the first surface is a first distance, and a vertical distance between the positioning portion and the first surface is greater than the first distance.

17. The electric oil pump according to claim 1, wherein the supporting member further comprises at least two third protrusion portions, the at least two third protrusion portions each are configured to protrude out from the second surface of the main body portion toward a direction away from the second surface, and distributed at an interval in a circumferential direction of the supporting member;

a vertical distance between one end of the connecting terminal adjacent to the second surface and the second surface is a second distance, and a height of the third protrusion portions in a protruding direction of the third protrusion portions is less than the second distance.

18. The electric oil pump according to claim 17, wherein the supporting member further comprises a fourth protrusion portion, the fourth protrusion portion is configured to protrude out from the second surface of the main body portion toward the direction away from the second surface, and is closer to the center of the supporting member than the third protrusion portion, and a height of the fourth protrusion portion in a protruding direction of the fourth protrusion portion is less than the second distance.

19. The electric oil pump according to claim 1, wherein the supporting member further comprises a slot circumferentially disposed along an outer peripheral side wall of the supporting member, and the electric oil pump further comprises a seal ring at least partially disposed in the slot.

* * * * *